United States Patent Office 2,982,787
Patented May 2, 1961

1

2,982,787
ETHERS OF CYCLOHEXENE
Raymond I. Hoaglin and Amelio E. Montagna, South Charleston, W. Va., and Donald G. Kubler, Columbia, S.C., assignors to Union Carbide Corporation, a corporation of New York
No Drawing. Filed Nov. 28, 1958, Ser. No. 776,747
2 Claims. (Cl. 260—611)

The present invention is directed to novel compositions of matter and to a method of preparing the same. More particularly, this invention is directed to novel olefinically unsaturated, diether, aliphatic-substituted, cycloaliphatic compounds characterized by the presence therein of at least one olefinic group in the aliphatic moiety and at least one olefinic group in the cycloaliphatic moiety thereof.

The compounds of this invention can be conveniently represented with reference to the general formula:

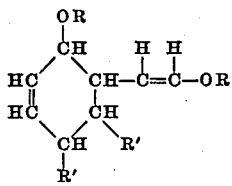

wherein R represents alkyl groups containing from 1 to 10 carbon atoms, such as methyl, ethyl, propyl, isopropyl, butyl, isobutyl, secondary butyl, amyl, hexyl, heptyl, octyl, isooctyl, nonyl, and decyl, or 2-alkoxyethyl groups having the structure R″OCH$_2$CH$_2$ wherein R″ is a lower alkyl group such as methyl, ethyl, propyl, hexyl, octyl, and the like, and wherein R′ represents hydrogen atoms or lower alkyl groups.

The novel compounds of this invention are liquids which are particularly useful as starting materials for the preparation of derivatives containing an alkoxylcyclohexene and alkoxycyclohexane rings. For example, 4-(2-methoxyvinyl)-2-methoxy-1-cyclohexene can be converted to 4-(2,2-dimethoxyethyl)-2-methoxy-1-cyclohexene by reaction with methanol in the presence of a strong acid catalyst. The acetal thus obtained may be hydrogenated by conventional procedures to form 1-(2,2-dimethoxyethyl)-2-methoxycycolhexane. This latter acetal can undergo acid-catalyzed hydrolysis to produce 2-methoxy-1-formylmethyl cyclohexane which can easily undergo oxidation to form 2-methoxycyclohexyl-1-acetic acid. Likewise, 4-(2 - methoxyvinyl)-2-methoxy-1-cyclohexene can undergo hydrogenation under conventional procedures to form 1-(2-methoxyethyl)-2-methoxycyclohexane; or by acid-catalyzed hydrolysis there is formed 4-formylmethyl-2-methoxy-1-cyclohexene which can be oxidized by air in the presence of silver oxide catalyst to form 4-carbmethoxy-3-methoxy-1-cyclohexene. Some of these derivatives are useful as plasticizers for vinyl type resins. Additionally, the novel compounds of this invention are also particularly useful as froth flotation reagents for obtaining copper and zinc values from copper and zinc ores in the manner similar to that disclosed in U.S. 2,561,251.

The novel compounds of the invention can be prepared by heating a quantity of 1-alkoxy-1,3-alkadienes or 1-(2-alkoxyethoxy)-1,3-alkadienes at an elevated temperature under autogenous or superatmospheric pressure in a closed reaction vessel.

2

The reaction can be illustrated by the following equation:

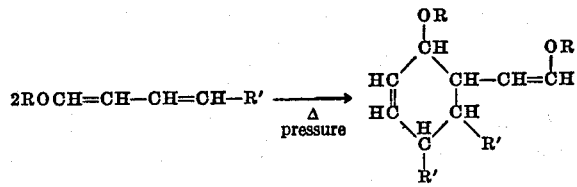

In the above reaction R and R′ are as defined heretofore.

The quantity of the 1-alkoxy-1,3-alkadienes or 1-(2-alkoxyethoxy)-1,3-alkadienes required for the above reaction is not critical, the molecules produced representing the condensation of two molecules of the alkoxy-1,3-alkadienes. These starting materials can be made by the method disclosed in British Patent 724,012; German Patent 843,696; G. Meier, Ber. 77, 108 (1944); G. C. Farmilio and R. V. V. Nicholls, Can. J. Research 28B, 689–700 (1950).

Typical compounds suitable for use in providing the novel compounds of this invention include:

1-methoxy-1,3-butadiene
1-ethoxy-1,3-butadiene
1-hexoxy-1,3-butadiene
1-(2-methoxyethoxy)-1,3-butadiene
1-propoxy-1,3-butadiene
1-butoxy-1,3-butadiene
1-isobutoxy-1,3-butadiene
1-octyloxy-1,3-butadiene
1-decyloxy-1,3-butadiene 1-methoxy-1,3-pentadiene
1-ethoxy-1,3-pentadiene
1-hexoxy-1,3-pentadiene
1-(2-methoxyethoxy)-1,3-pentadiene
1-propoxy-1,3-pentadiene
1-butoxy-1,3-pentadiene
1-isobutoxy-1,3-pentadiene
1-octyloxy-1,3-pentadiene
1-decyloxy-1,3-pentadiene 1-methoxy-1,3-hexadiene
1-ethoxy-1,3-hexadiene
1-hexoxy-1,3-hexadiene
1-(2-methoxyethoxy)-1,3-hexadiene
1-propoxy-1,3-hexadiene
1-butoxy-1,3-hexadiene
1-isobutoxy-1,3-hexadiene
1-octyloxy-1,3-hexadiene
1-decyloxy-1,3-hexadiene 1-methoxy-1,3-octadiene
1-ethoxy-1,3-octadiene
1-hexoxy-1,3-octadiene
1-(2-methoxyethoxy)-1,3-octadiene
1-propoxy-1,3-octadiene
1-butoxy-1,3-octadiene
1-isobutoxy-1,3-octadiene
1-octyloxy-1,3-octadiene
1-decyloxy-1,3-octadiene The pressure at which the reaction is carried out is also not a critical feature of the process of the invention. Autogenous or superatmospheric pressure can be employed as desired. It is preferred, however, to carry out the reaction under autogenous pressure. The temperature at which the reaction may be carried out is critical, however, and ranges between 150° C. and 300° C. It is preferred, however, to conduct the reaction at temperatures of between 180° C. and 275° C.

If desired, a small amount of a polymerization inhibitor may be present during the course of the reaction.

In this regard, amounts from about 0.001 percent up to about 5 percent are effective. The reaction will proceed, however, without such an inhibitor. Among those inhibitors which may be employed are hydroquinone, naphthoquinone, quaiacol, pyrogallol, t-butyl catechol, nitrophenol, and other antioxidants. A particularly preferred inhibitor is an antioxidant containing as an active ingredient p-N-butylaminophenol.

The residence time of the reaction is also not necessarily critical, but, of course, to be practical, must be sufficient to carry the reaction to a significant degree of completion. It is preferable, however, to conduct the reaction for a period of from two to six hours, although a reaction period of as little as one hour and as much as 24 hours has proven worthwhile. The reaction may take place optionally in either an inert or oxygen-containing atmosphere.

In the procedure described above for the reaction of the aforementioned starting materials, a variety of the novel cyclohexenes with which this invention is concerned are readily prepared and include:

3-methoxy-4-(2-methoxyvinyl)-1-cyclohexene
3-ethoxy-4-(2-ethoxyvinyl)-1-cyclohexene
3-hexoxy-4-(2-hexoxyvinyl)-1-cyclohexene
3-(2'-methoxyethoxy)-4-[2-(2'-methoxyethoxy) - vinyl]-1-cyclohexene
3-propoxy-4-(2-propoxyvinyl)-1-cyclohexene
3-butoxy-4-(2-butoxyvinyl)-1-cyclohexene
3-isobutoxy-4-(2-isobutoxyvinyl)-1-cyclohexene
3-octyloxy-4-(2-octyloxyvinyl)-1-cyclohexene
3-decyloxy-4-(2-decyloxyvinyl)-1-cyclohexene
5,6-dimethyl-3-methoxy-4-(2-methoxyvinyl) - 1 - cyclohexene
5,6-dimethyl-3-ethoxy - 4 - (2 - ethoxyvinyl) - 1 - cyclohexene
5,6-dimethyl-3-hexoxy - 4 - (2 - hexoxyvinyl) - 1 - cyclohexene
5,6-dimethyl-3-(2'-methoxyethoxy)-4-[2 - (2' - methoxyethoxy)-vinyl]-1-cyclohexene
5,6-dimethyl-3-propoxy-4-(2 - propoxyvinyl) - 1 - cyclohexene
5,6-dimethyl-3-butoxy - 4 (2 - butoxyvinyl) - 1 - cyclohexene
5,6-dimethyl-3-isobutoxy-4-(2-isobutoxyvinyl) - 1 - cyclohexene
5,6-dimethyl-3-octyloxy-4-(2-octyloxyvinyl) - 1 - cyclohexene
5,6-dimethyl-3-decyloxy-4-(2-decyloxyvinyl) - 1 - cyclohexene
5,6-diethyl-3-methoxy-4-(2 - methoxyvinyl) - 1 - cyclohexene
5,6-diethyl-3-ethoxy-4-(2-ethoxyvinyl)-1-cyclohexene
5,6-diethyl-3-hexoxy-4-(2-hexoxyvinyl)-1-cyclohexene
5,6-diethyl-3-(2'-methoxyethoxy) - 4 - [2 - (2' - methoxyethoxy)-vinyl]-1-cyclohexene
5,6-diethyl-3-propoxy - 4 - (2 - propoxyvinyl) - 1 - cyclohexene
5,6-diethyl-3-butoxy-4-(2-butoxyvinyl)-1-cyclohexene
5,6-diethyl-3-isobutoxy-4-(2-isobutoxyvinyl) - 1 - cyclohexene
5,6-diethyl-3-octyloxy - 4 - (2 - octyloxyvinyl) - 1 - cyclohexene
5,6-diethyl-3-decyloxy-4-(2 - decyloxyvinyl) - 1 - cyclohexene
5,6-dibutyl-3-methoxy-4-(2-methoxyvinyl) - 1 - cyclohexene
5,6-dibutyl-3-ethoxy-4-(2-ethoxyvinyl)-1-cyclohexene
5,6-dibutyl-3-hexoxy-4-(2-hexoxyvinyl)-1-cyclohexene
5,6-dibutyl-3-(2'-methoxyethoxy) - 4 - [2 - (2' - methoxyethoxy)-vinyl]-1-cyclohexene
5,6-dibutyl-3-propoxy - 4 (2 - propoxyvinyl) - 1 - cyclohexene
5,6-dibutyl-3-butoxy - 4 - (2 - butoxyvinyl) - 1 -cyclohexene
5,6-dibutyl-3-isobutoxy - 4 - (2 - isobutoxyvinyl) - 1-cyclohexene
5,6-dibutyl-3-octyloxy - 4 - (2 - octyloxyvinyl) - 1 - cyclohexene
5,6-dibutyl-3-decyloxy - 4 - (2 - decyloxyvinyl) - 1 - cyclohexene The following examples will serve to illustrate the practice of the invention.

Example 1

To a stainless steel Aminco autoclave (rocker type, with external heating jacket), 504 grams of 1-methoxy-1,3-butadiene were charged. The contents of the autoclave were heated to 250° C. (without purging the air from the autoclave) while being rocked, and the reaction mixture was maintained at 245° C.–255° C. for three hours. After cooling, the crude product was fractionally distilled at reduced pressure. Three hundred seventy-seven grams (75 percent of the theoretical yield) of refined 3-methoxy-4-(2-methoxyvinyl)-1-cyclohexene was obtained. A polymeric residue was also obtained which weighed 74.5 grams and corresponded to a 14.8 percent conversion of the monomer to polymer. The ratio of product to polymer was 5.06 to 1. Fifteen grams of unreacted 1-methoxy-1,3-butadiene were recovered.

3 - methoxy - 4 - (2 - methoxyvinyl) - 1 - cyclohexene was characterized by the following properties:

Physical state _____ Liquid (colorless).
Boiling point ° C. _____ 85 at 5 mm. Hg.
Refractive index $n_D^{20}$ _____ 1.4812.
Specific gravity at 20/20° C. _____ 0.984.
Analysis:
   Carbon _____ 71.00% by weight.
   Hydrogen _____ 9.65% by weight.
   Degree of unsaturation _____ 23.78 meq./g.
   Molar refraction _____ 48.67.
Theoretical:
   Carbon _____ 71.39% by weight.
   Hydrogen _____ 9.59% by weight.
   Degree of unsaturation _____ 23.78 meq./g.
   Molar refraction _____ 48.53.

Example 2

To the autoclave described in Example 1 there was charged a mixture of 1466 grams 1-methoxy-1,3-butadiene and 1 gram of a commercial antioxidant containing as an active ingredient p-N-butylaminophenol. The autoclave was carefully purged with oxygen-free nitrogen to assure an inert atmosphere. After reaction for three hours at 245° C.–255° C. and after fractional distillation as in Example 1, 982 grams of refined 3-methoxy-4-(2-methoxyvinyl)-1-cyclohexene and 276 grams of polymeric residue were obtained. The yield of desired product was 67 percent of theory, and the ratio of product to polymer was 3.58 to 1.

Example 3

In equipment and under essentially the same oxygen-free conditions as described in Example 2, a mixture of 504 grams of 1-methoxy-1,3-butadiene and 2 grams of an antioxidant were reacted at 180° C. for four hours. Fractional distillation of the crude product yielded 225 grams of refined 3-methoxy-4-(2-methoxyvinyl)-1-cyclohexene and 39 grams of polymer. This corresponds to a yield of 44.7 percent of product and a ratio of product to polymer of 5.77 to 1.

Example 4

To the autoclave described in Example 1 there was charged 980 grams (10.0 moles) of 1-ethoxy-1,3-butadiene and 2 grams of hydroquinone. After heating at 180° C. for six hours and after fractional distillation, 523 grams (2.67 moles) of refined 3-ethoxy-4-(2-ethoxyvinyl)-1-cyclohexene and 323 grams (3.30 moles) of unreacted 1-ethoxy-1,3-butadiene were recovered. Polymeric residue amounted to 84 grams, which represented a yield of 8.6 percent.

The yield of desired product corresponded to 53.4 percent of theory at an efficiency of 79.7 percent.

3-ethoxy-4-(2-ethoxyvinyl)-1-cyclohexene exhibited the following properties:

| | |
|---|---|
| Physical state | Liquid (colorless). |
| Boiling point ° C. | 97 at 5 mm. Hg. |
| Refractive index $n_D^{20}$ | 1.4716. |
| Specific gravity at 20/15.6° C. | 0.943. |
| Analysis: | |
| Carbon | 73.20% by weight. |
| Hydrogen | 10.8% by weight. |
| Degree of unsaturation | 19.9 meq./g. |
| Molar refraction | 58.26. |
| Theoretical: | |
| Carbon | 73.45% by weight. |
| Hydrogen | 10.27% by weight. |
| Degree of unsaturation | 20.38 meq./g. |
| Molar refraction | 57.77. |

Examples 5 and 6

In an apparatus and following the procedure described in Example 4, 1-ethoxy-1,3-butadiene was reacted at a temperature of 180° C. in the presence of 0.2 percent by weight hydroquinone to form 3-ethoxy-4-(2-ethoxyvinyl)-1-cyclohexene. The following two examples illustrate the results obtained:

| Example No. | Reaction Time, Hours | Product Yield, Percent | Product Efficiency, Percent | Polymer Yield, Percent |
|---|---|---|---|---|
| 5 | 1 | 19.0 | 65.5 | 4.4 |
| 6 | 4 | 48.1 | 79.4 | 8.7 |

It should be noted that at 180° C. no increase in efficiency is obtained by increasing the time of reaction from four hours (Example 6) to six hours (Example 4).

Example 7

To a 300 ml. stainless steel autoclave similar to that of Example 1 there were charged 144 grams (0.9 mole) of 1-hexoxy-1,3-butadiene and 0.5 gram of a commercial antioxidant containing as an active ingredient p-N-butyl-aminophenol. The autoclave was purged with nitrogen, and then was heated at 250° C. for three hours. The reaction product was distilled to provide 57 grams of 3-hexoxy-4-(2-hexoxyvinyl)-1-cyclohexene, which corresponds to a yield of 39.6 percent of theory. The refined product, a colorless liquid, had the following properties: boiling point, 155° C. at 0.5 mm. of mercury and refractive index, $n_D^{20}$, 1.4691.

Example 8

To an autoclave, as in Example 1, there was charged 168 grams of 1-(2-methoxyethoxy)-1,3-butadiene and 0.5 gram of a commercial antioxidant containing as an active ingredient p-N-butylaminophenol. After the bomb had been purged with nitrogen, the mixture was heated for three hours at 250° C. Upon fractional distillation of the crude reaction product there was obtained 81 grams of 3-(2'-methoxyethoxy)-4-[2-(2'-methoxyethoxy)vinyl]-1-cyclohexene which corresponds to a yield of 48.1 percent of theory. The refined product, a colorless liquid, had the following properties: boiling point, 134° C. at 0.5 mm. of mercury and refractive index, $n_D^{20}$, 1.4778.

Example 9

In apparatus and procedure as detailed in Example 1, 168 grams of 1-methoxy-1,3-hexadiene and 0.5 gram of a commercial antioxidant containing as an active ingredient p-N-butylaminophenol where reacted at 250° C. for three hours. After distillation, 24 grams of 5,6-diethyl-3-methoxy-4-(2'-methoxyvinyl)-1-cyclohexene was obtained, corresponding to a yield of 14.3 percent of theory. The refined product had the following properties: boiling point, 92° C. at 0.8 mm. of mercury and refractive index, $n_D^{20}$, 1.4786.

What is claimed is:

1. Olefinically unsaturated diethers having structures corresponding to the formula:

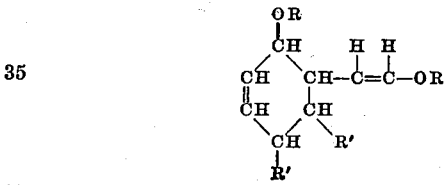

wherein R represents 2-alkoxyethyl groups having the structure R"OCH$_2$CH$_2$, in which R" is a lower alkyl group; and wherein R' is hydrogen.

2. 3-(2'-methoxyethoxy)-4-[2-(2'-methoxyethoxy)-vinyl]-1-cyclohexene.

References Cited in the file of this patent

Norton: Chemical Reviews, vol. 31, No. 2 (1942), pp. 319–322.

Nazarov et al: Chemical Abstracts, vol. 43 (1949), pp. 2576–2577.